United States Patent
Narashimha et al.

(10) Patent No.: US 7,672,671 B2
(45) Date of Patent: Mar. 2, 2010

(54) METHOD AND APPARATUS FOR ENABLING OPERATORS WITH OPERATORS WITH UNUSED BANDWIDTH TO ACQUIRE USERS

(75) Inventors: Murali Narashimha, Grayslake, IL (US); Thomas C. Hill, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 388 days.

(21) Appl. No.: 11/461,472

(22) Filed: Aug. 1, 2006

(65) Prior Publication Data

US 2008/0031192 A1    Feb. 7, 2008

(51) Int. Cl.
*H04W 36/00* (2009.01)

(52) U.S. Cl. .................. 455/436; 455/442; 455/435.2; 370/331

(58) Field of Classification Search .............. 455/435.2, 455/414.1, 437, 442, 436, 452.2, 452.1; 370/331
See application file for complete search history.

(56) References Cited

U.S. PATENT DOCUMENTS

| | | | | |
|---|---|---|---|---|
| 6,112,088 | A * | 8/2000 | Haartsen | 455/437 |
| 6,370,380 | B1 * | 4/2002 | Norefors et al. | 455/436 |
| 7,328,010 | B2 * | 2/2008 | Turina et al. | 455/426.1 |
| 2001/0056395 | A1 | 12/2001 | Khan | |
| 2003/0101124 | A1 | 5/2003 | Semret et al. | |
| 2005/0227691 | A1 * | 10/2005 | Pecen et al. | 455/435.2 |

* cited by examiner

*Primary Examiner*—Nick Corsaro
*Assistant Examiner*—Sarwat Chughtai (57) ABSTRACT

A first access network [500] has a servicing element [525] for servicing a mobile station 105]. A negotiation element [530] negotiates with a second access network [115] for a right for the second access network [115] to provide wireless service to the mobile station [105]. The negotiation comprises sending an offer of a benefit from the second access network [115] to the first access network [500]. A processor [505] accepts the offer of the benefit from the second access network [115] and transmits a first token [515] to the second access network [115].

8 Claims, 6 Drawing Sheets

METHOD AND APPARATUS FOR ENABLING OPERATORS WITH OPERATORS WITH UNUSED BANDWIDTH TO ACQUIRE USERS

TECHNICAL FIELD

This invention relates generally to a method, apparatus, and system for enabling wireless service operators to acquire users.

BACKGROUND

Subscriber devices are becoming increasingly complex in the types of wireless communication media they support. Multi-mode devices that have embedded Global System for Mobile Communications ("GSM") and Code division multiple access ("CDMA") modems along with Wireless Local Area Network ("WLAN") and Bluetooth modems are becoming common. Newer air-interfaces such as Wireless Maximize ("WiMAX") are only going to make the task of choosing an appropriate access network more complex.

Network interconnections are currently being designed to enable multi-mode devices to move from one access network to another. All of these architectures require pre-arranged agreements between the service providers controlling the access networks. For example, to enable a multi-mode GSM-WLAN handset to move between the two types of access networks, a cellular operator might make agreements with a WLAN hot spot service provider. The actual movement between the two types of networks could happen by means of access networks/system selection or handoffs.

A problem arises, however, when a multi-mode mobile station is within a congested service area. Even though there may be other available networks for servicing the mobile station, if the cellular operator does not have pre-existing agreements with any of the other available network operators, then the mobile subscriber will remain in the congested network because the available networks will not accept a handoff of the mobile subscriber. This therefore results in inefficient utilization of network bandwidth.

There are systems in the art relating to real-time buying and real-time selling of bandwidth. In these systems, there are multiple users (i.e., buyers) and multiple networks (i.e., sellers). The users place bids and the highest bidder wins the bandwidth. In these systems, the bandwidth itself, as opposed to the right to service a particular mobile station, are being bought and sold.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

In a typical urban/suburban environment in the United States, it is already possible to see coverage of at least three different types of access networks such as Mobile Communications ("GSM"), Code division multiple access ("CDMA"), and Wireless Local Area Network ("WLAN") hotspots. These hotspots may be privately owned. For each of these types of access networks, a device such as a mobile station is likely to find multiple service providers. The utilization of each of these access networks varies. For example, while the GSM network is overloaded, the WLAN hotspots might have plenty of bandwidth available. Also, due to deployment constraints and inadequate capacity, a GSM operator's network might be overloaded while a CDMA operator might have available capacity in the same location. In such situations, the access network that is currently providing service to a device might find it beneficial to move the user/device to another access network. This would satisfy the needs of both service providers. That is, the second access network could purchase the user's traffic/session from the first access network to alleviate the first access network's congestion or to reduce the first access network's costs.

Conceptually, this is similar to roaming between networks. Roaming, however, requires pre-arranged agreements. The focus of the teachings described below is to enable a negotiation of the right to service a particular mobile station in real-time, in an ad-hoc manner between multiple different access networks. These teachings are also related to the selling of wire-line bandwidth by wire-line telephony companies in the form of phone cards. These teachings are directed to bidding by the user (or software on the user device) instead of auctioning of bandwidth. Meanwhile, the user is under the control of the current access network that holds, for example, the authentication parameters.

These teachings provide transactional elements to enable a business model in which access networks with available capacity may "buy users" from incumbent access networks. This would enable smaller networks (even with private WLAN access point owners) to derive income from their excess bandwidth. The resource being sold is the user (with some constraints) and the buyers are competing networks. This system therefore provides a viable business model.

A token is utilized for transactions between the access networks. A token includes a plurality of information about the device, including the identity of the device, information about the primary service provider, information about the current access network, quality of service requirements, and authentication information for the user that are temporarily valid.

The token may be stored in the network and in the device. Alternatively, the token may be stored only in the network. The token may be available at all times or it may be generated just when the current network decides to sell the user.

A token stored at the mobile station differs slightly from the token stored in the access network. That is, the token stored in the mobile station has an authentication key that is complementary to the authentication key in the access network's token. A second access network would need to take both tokens to authenticate the user and provide corresponding service.

The selling of a user refers to a real-time financial agreement between a first access network and a second access network where the user's traffic is carried via the second access network for a negotiated duration. The second access network receives money or some other benefit in return. The access networks may alternatively negotiate for a certain number of calls or sessions instead of time duration. According to various embodiments described below, the various access networks may all access a shared server or core network or have access to each other's servers or core networks. That is, after the second network acquires the user, the second service provider provides a way for the first service provider to route calls to the user through the second network without using the first service provider's resources. The Internet provides simple ways to set up and connect multiple networks.

Figure 1:
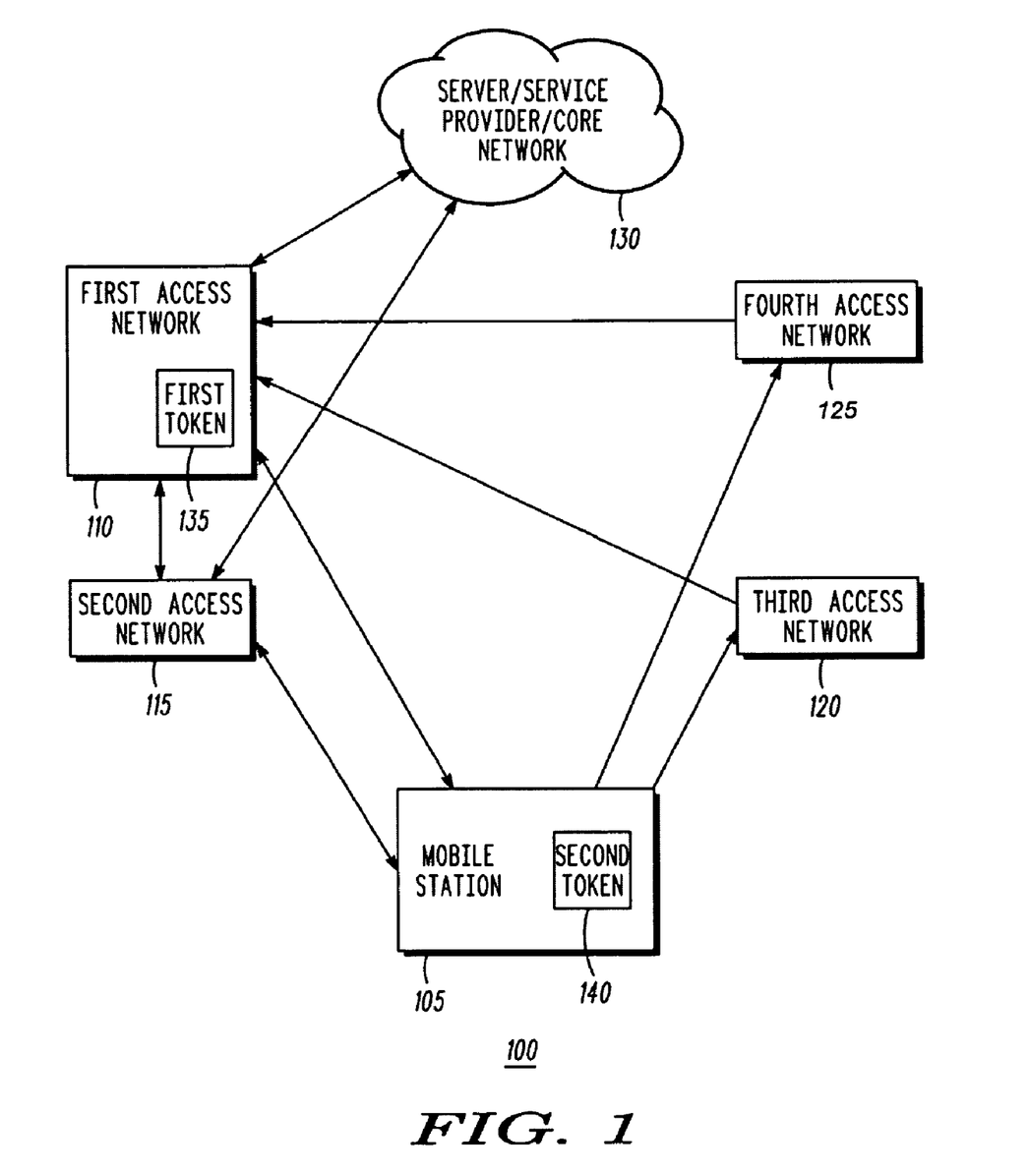
FIG. 1 illustrates a first wireless system for allowing a mobile station to initiate a purchase of the mobile station's wireless usage according to at least one embodiment of the invention.
Figure 2:
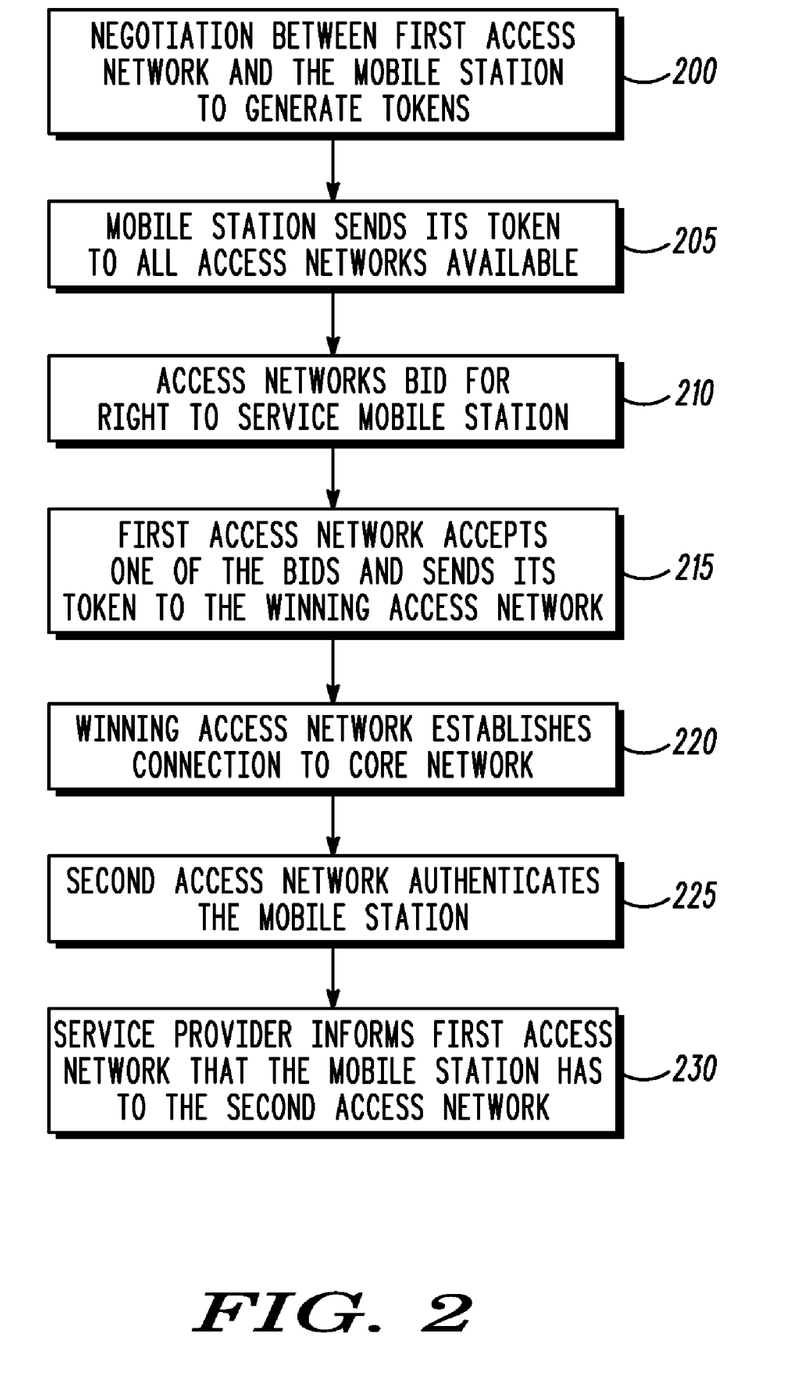
FIG. 2 illustrates a method of first wireless system allowing a mobile station to initiate a purchase of the mobile station's wireless usage according to at least one embodiment of the invention.

FIGS. 1 and 2, as discussed below, describe a protocol for a network with available bandwidth to purchase a mobile station, or a mobile station's traffic, from a primary service provider for the user. This procedure ensures that a decision about when and whether the mobile station may move to the alternate network is controlled by the primary service provider. This procedure is triggered by the mobile station sending indications on all of the air interfaces that are deployed at the mobile station's location that the mobile station's traffic might be available for purchase.

FIG. 1 illustrates a first wireless system 100 for allowing a mobile station 105 to initiate a purchase of the mobile station's 105 wireless usage according to at least one embodiment of the invention. As shown, the first wireless system 100 includes a first access network 110, a second access network 115, a third access network 120, a fourth access network 125, and a server, service provider, or core network 130. Each of the access networks may provide wireless service under a different technology. Alternatively, each or some of the access networks may provide wireless service via the same technology.

For example, the first access network 110 may utilize GSM, the second access network 115 may utilize WiMAX, the third access network 120 may be a WLAN, and the fourth access network 125 may utilize CDMA. The mobile station 305 may operate on multiple technologies, such as WiMAX, WLAN, CDMA, Global System for Mobile Communications ("GSM"), and software-definable radios, to name a few. These technologies are exemplary and it should be appreciated that additional technology may also be utilized. The first access network 110, the second access network 115, the third access network 120, and the fourth access network 125 may provide wireless service to overlapping coverage areas. In other words, more than one, or possibly all, of these access networks may provide wireless service to the mobile station 105 located in a particular location of their respective wireless coverage areas.

In FIG. 1, the first access network 110 initially provides wireless service to the mobile station 105. For example, the first access network 110 may be owned by a wireless service provider such as Verizon™, Sprint™, or T*Mobile™. When the mobile station 105 initially connects to the first access network 110, a negotiation occurs between the first access network 110 and the mobile station 105 to generate a first token 135 and a second token 140. In alternative embodiments, a single token, instead of a separate first token 135 and second token 140, is utilized that is stored at the first access network 110. The first token 135 may be stored in a memory of the first access network 110, and the second token 140 may be stored in a memory of the mobile station 140. The first token 135 and the second token 140 may each be pieces of software containing information required for authenticating the mobile station 105 and providing wireless service. The first token 135 may include a first authentication key, and the second token 140 may include a second authentication key. Both the first token 135 and the second token 140 are needed to authenticate the mobile station 105.

When the mobile station 105 detects wireless coverage provided by the second access network 115, the third access network 120, and the fourth access network 125, the mobile station 105 transmits the second token 140 to these access networks. The second token 140 may include the quality of service requirements for servicing the mobile station 105. In the event that any of the second access network 115, the third access network 120, and the fourth access network 125 have available bandwidth and/or a desire to purchase the mobile station's 105 wireless session, these access networks may each send a "bid" to the first access network 110. For example, the bid may include a request for money or credits in exchange for servicing the mobile station 105. Alternatively, the bid may include some other type of remuneration other than money or credits.

The first access network 110 evaluates the bids and then determines a "winner," i.e., the access network to which the right to service of the mobile station 105 will be provided. The winner may be determined based on which of the bidding access networks offers to service the mobile station 105 in exchange for the least amount of money or the least expensive of some other item alone or in combination with money. Another factor to consider is the quality of service. That is, in an embodiment, a bidding access network should be able to meet the same quality of service requirements as required by the mobile station 105. The quality of service requirements may be listed in the second token 140 that is stored within the mobile station 105 and provided to the second access network 115, the third access network 120, and the fourth access network 125.

The first token 135 is transmitted from the first access network 110 to the access network corresponding to the winning bid. In the event that the second access network 115 provides the winning bid, then it would receive the first token 135. The second access network 115 then has to establish a connection with the server, service provider, or core network 130. The server, service provider, or core network 130 may be specific to the service provider. Alternatively, the server, service provider, or core network 130 may be a common server, service provider, or core network. The purpose of establishing the connection between the second access network 115 and the server, service provider, or core network 130 is so that calls may be routed and received. The second access network 115 than authenticates the mobile station 105 and the mobile station 105 begins to use the second access network 115. During the authentication process, the first token 135 and the second token 140 are utilized. Finally, the server, service provider, or core network 130, or some entity in communication with the server, service provider, or core network 130, informs the first access network 110 that the mobile station 105 has moved over to the second access network 115.

This process may be of particular value to a proprietor having a WLAN network with available bandwidth. For example, a coffee shop may have a WLAN. When a user walks into the coffee shop with the mobile station 105, the mobile station 105 may begin the negotiation process with the WLAN and any other access networks detected. By providing wireless service via the WLAN, the owner of the coffee shop may earn money from excess bandwidth not currently being used. The first access network 110 also benefits. For example, if the first access network 110 is experiencing congestion, it may cost less to pay the WLAN to provide the wireless service to the mobile station 105. Moreover, even if it is not congested, there is always a cost involved with providing wireless service to the mobile station 105, and it may be cheaper for the WLAN to provide the wireless service to the mobile station 105 instead of the first access network 110.

FIG. 2 illustrates a method of the first wireless system 100 allowing the mobile station 105 to initiate a purchase of the mobile station's 105 wireless usage according to at least one embodiment of the invention. First, at operation 200, a negotiation occurs between the first access network 110 and the mobile station 105. As a result of this negotiation, the first token 135 is generated and stored in a memory device of the first access network 110, and the second token 140 is generated and stored in a memory of the mobile station 140. Next, at operation 205, the mobile station 105 sends the second token 140 to all available access networks. In the embodiment shown in FIG. 1, the second token 140 is transmitted to the second access network 115, the third access network 120, and the fourth access network 125.

These access networks bid for the right to service the mobile station 105 at operation 210. After the bids are received, the first access network 110 determines which is the best bid and accepts one of the bids and sends the first token 135 to the winning bidder at operation 215. For example, if the second access network 115 provides the winning bid, the first token 135 would be transmitted to the second access network 115. Next, at operation 220, the second access network 115 establishes a connection with the server, service provider, or core network 130. At operation 225, the second access network 115 authenticates the mobile station 105. The first token 135 and the second token 140 are utilized during this authentication process. Finally, at operation 230, the mobile station's 105 service provider informs the first access network 110 that the mobile station 105 has moved to the second access network 115.

The protocol of FIGS. 1 and 2 requires the mobile station 105 to initiate the dialogue for purchasing the mobile station's 105 usage. This might allow the second access network 115 to provide service to the mobile station 105 without going through the bidding and negotiation with the server, service provider, or core network 130. This could provide partial functionality to the user, i.e., it might be possible to originate calls via the mobile station 105, but not receive them.

Figure 3:
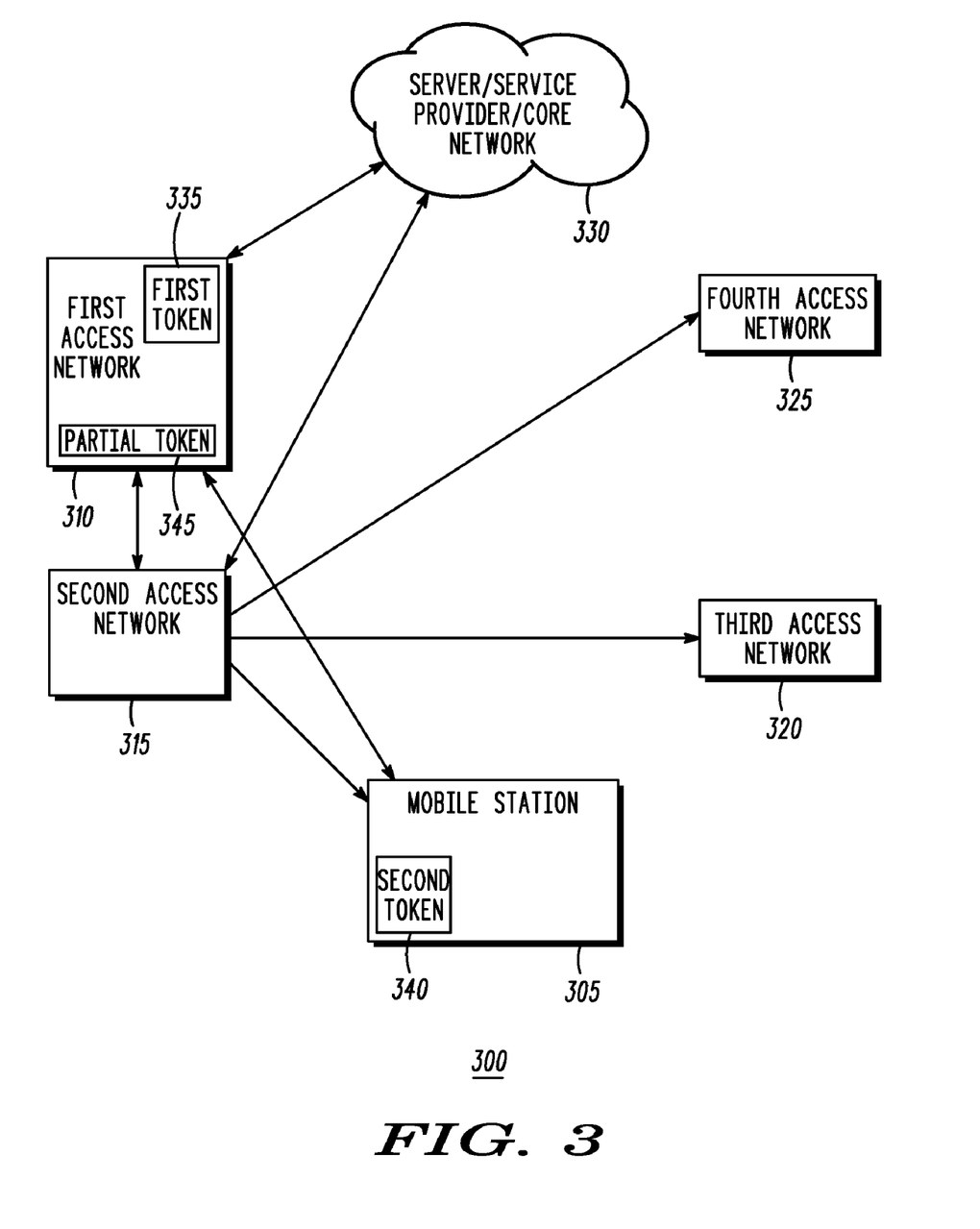
FIG. 3 illustrates a second wireless system for allowing an access network to detect a mobile station and to initiate a purchase of the mobile station's wireless usage according to at least one embodiment of the invention.

FIG. 3 illustrates a second wireless system 300 for allowing an access network to detect a mobile station 305 and to initiate a purchase of the mobile station's 305 wireless usage according to at least one embodiment of the invention. As shown, the second wireless system 300 includes a first access network 310, a second access network 315, a third access network 320, a fourth access network 325, and a server, service provider, or core network 330.

Each of the access networks may provide wireless service under a different technology. Alternatively, each of the access networks may provide wireless service via the same technology. For example, the first access network 310 may utilize GSM, the second access network 315 may utilize WiMAX, the third access network 320 may be a WLAN, and the fourth access network 325 may utilize CDMA. These technologies are exemplary and it should be appreciated that additional technologies may also be utilized. The first access network 310, the second access network 315, the third access network 320, and the fourth access network 325 may provide wireless service to overlapping coverage areas. In other words, more than one, or possibly all, of the access networks may provide wireless service to a mobile station located in a particular location of their respective wireless coverage areas.

In FIG. 3, the first access network 310 initially provides wireless service to the mobile station 305. For example, the first access network 110 may be owned by a wireless service provider such as Verizon™, Sprint™, or T*Mobile™. FIG. 3 illustrates a protocol for an access network having available bandwidth to purchase the mobile station 305 without an explicit indication from the mobile station 305 that the mobile station's 305 traffic is available for purchase. Accordingly, there is no way for the mobile station 305 and a purchasing access network to avoid informing the first access network 310 or the server, service provider, or core network 330 of such purchase. The second system 300 may require an access network having the available bandwidth to recognize the arrival of the mobile station 305 into its coverage area and determine its identity. Several techniques may make this possible. First, the mobile station 305 may periodically broadcast a "ping" on each of its air interfaces to inform of its presence. Second, a base station or access point of an access network may include an uplink receiver for different air interfaces to "snoop" on signaling from the mobile station 305.

The access network with available bandwidth then determines the identity of the first access network 310 that is currently serving the mobile station 305 and sends bids to it. The final transition from the first access network 310 to another access network is fully controlled by the first access network 310.

The first access network 310 may store a first token 335 and a partial token 345. The mobile station 305 may store a second token 340. The first token 335, second token 340, and partial token 345 may each be pieces of software containing information required for authenticating the mobile station 105 and providing wireless service. The first token 335 may include a first authentication key, and the second token 340 may include a second authentication key. Both the first token 335 and the second token 340 are needed to authenticate the mobile station 305. The partial token 345 is similar to the first token 335 except that it lacks the authentication information of the first token 335.

Figure 4:
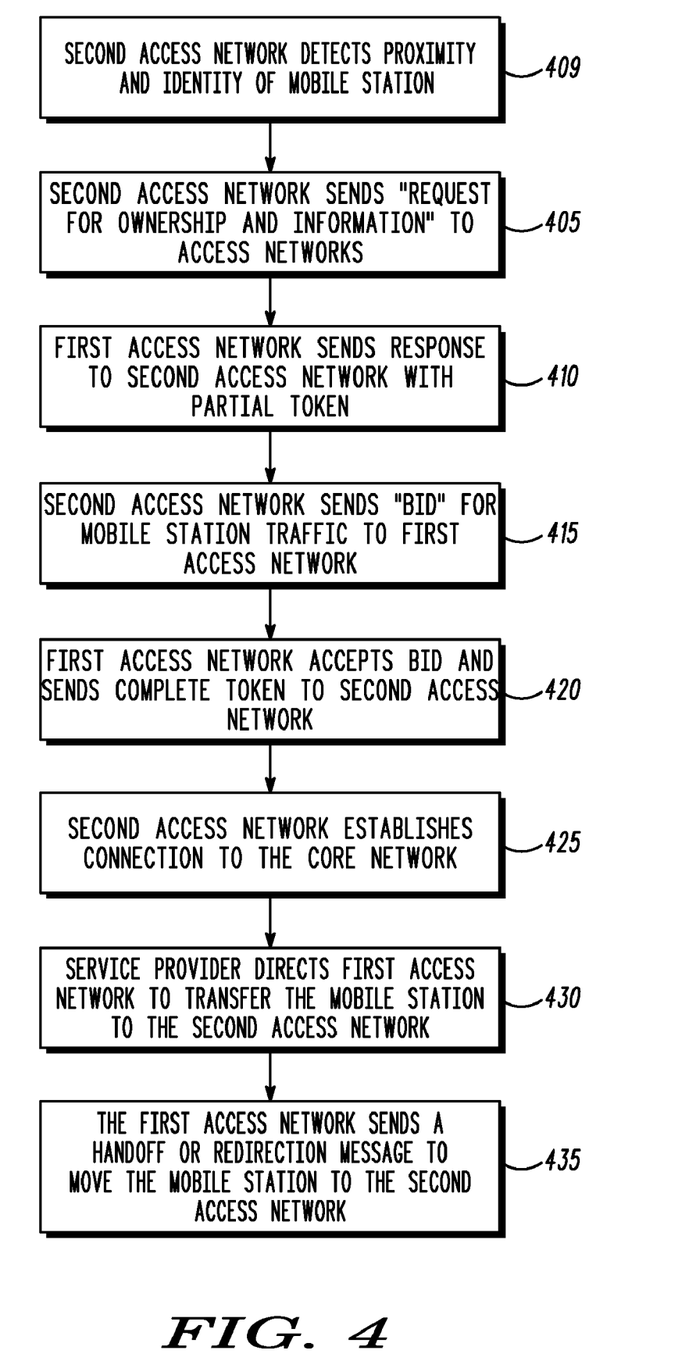
FIG. 4 illustrates a method of the second wireless system allowing other access networks, such as the second access network, to initiate a purchase of the mobile station's wireless usage according to at least one embodiment of the invention.

FIG. 4 illustrates a method of the second wireless system 300 allowing other access networks, such as the second access network 315, to initiate a purchase of the mobile station's 305 wireless usage according to at least one embodiment of the invention. First, at operation 400, the second access network 315 detects the proximity and identity of the mobile station 305. Next, the second access network 315 sends a "request for ownership and information" to all nearby access networks at operation 405. The reason why this request is sent out is because at this point in the method, the second access network 315 does not yet know which of the other access networks is servicing the mobile station 305.

At operation 410, the first access network 310 sends a response to the second access network 315 with the partial token 345. The partial token 345 is similar to the first token 335 that is stored with the first access network 310. However, the partial token 345 lacks the authentication information contained within the first token 335. Next, at operation 415, the second access network 315 sends a "bid" for the mobile Station's 305 traffic to the first access network 310. The first access network 310 may then either accept or deny the bid. If the bid is accepted, the complete first token 335 is sent to the second access network 315 at operation 420. The second access network 315 then establishes a connection to the server, service provider, or core network 330 for the mobile station's 305 normal server, service provider, or core network 330, or to a common server, service provider, or core network, so that calls may be routed and received. At operation 430, the service provider directs the first access network 310 to transfer the mobile station 305 to the second access network 315. Finally, at operation 435, the first access network 310 sends a handoff or redirection message to move the mobile station 305 to the second access network 315.

Figure 5:
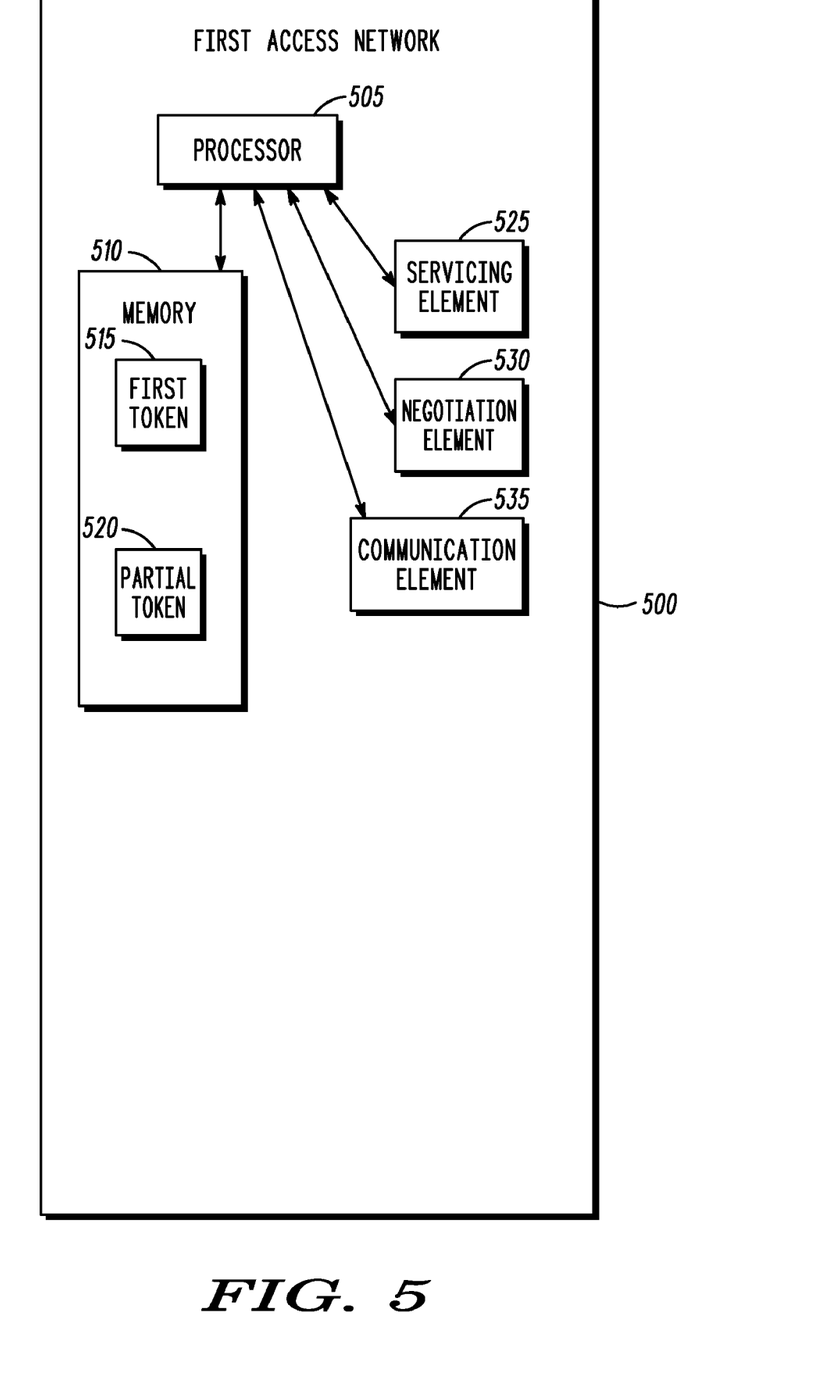
FIG. 5 illustrates a first access network according to at least one embodiment of the invention.

FIG. 5 illustrates a first access network 500 according to at least one embodiment of the invention. As shown, the first access network 500 includes a processor 505 and a memory 510. The memory 510 may store a first token 515 and a partial token 520. Alternatively, only the first token 515 is stored in the memory 510. The first access network 500 may also include a servicing element 525 to service a mobile station. The first access network 500 also includes a negotiation element 530 to negotiate with a second access network for a right for the second access network to provide wireless service to the mobile station. The negotiation includes sending an offer of a benefit from the second access network to the first access network 500. The processor 505 accepts the offer of the benefit from the second access network and transmits the first token 515 to the second access network. The servicing element 525 and the negotiation element 530 may comprise software modules implemented by the processor 505.

Figure 6:
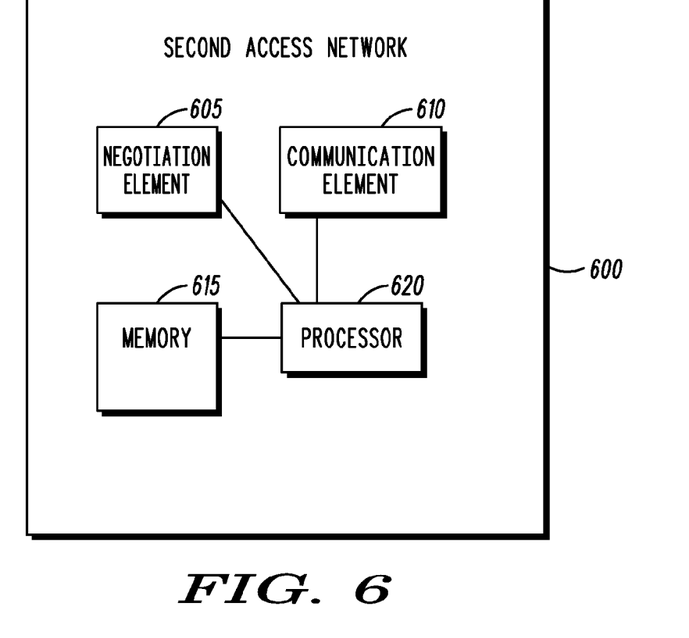
FIG. 6 illustrates a second access network according to at least one embodiment of the invention.

FIG. 6 illustrates a second access network 600 according to at least one embodiment of the invention. The second access network 600 may include a negotiation element 605, a communication element 610, a memory 615, and a processor 620. The negotiation element 605 negotiates with a first access network, such as the first access network 500 of FIG. 5, for a right for the second access network 600 to provide wireless service to a mobile station. The negotiation comprises sending an offer of a benefit to the first access network that is servicing the mobile station. The communication element 610 sends the offer of the benefit to the first access network and receives a first token from the first access network. The first token may be stored in the memory 615 after being received. The mobile station is transferred from the first access network to the second access network 600 in response to a successful negotiation. The negotiation element 605 may comprise a software module implemented by the processor 620.

Figure 7:
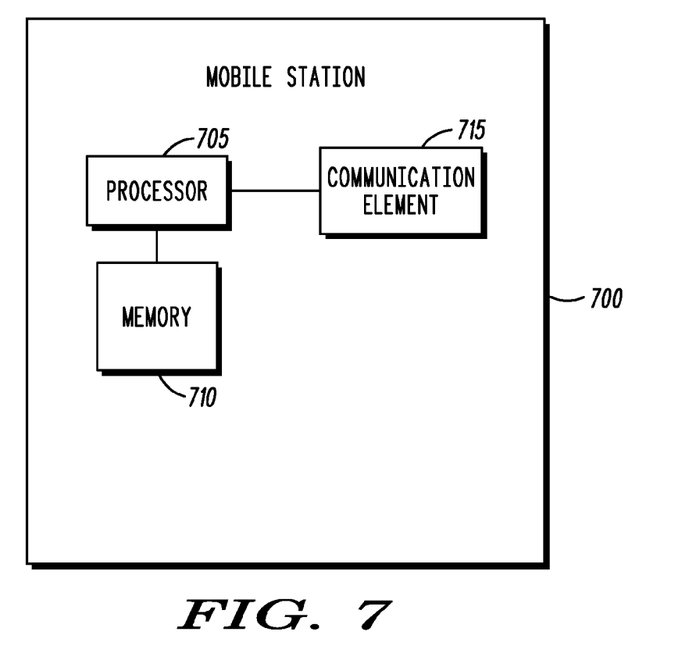
FIG. 7 illustrates a mobile station according to at least one embodiment of the invention.

FIG. 7 illustrates a mobile station 700 according to at least one embodiment of the invention. The mobile station 700 includes a processor 705 to negotiate with a first access network, such those shown in FIGS. 1 and 3, to generate a first token and a second token. A memory 710 stores the second token. A communication element 715 communicates with the first access network and send the second token to at least a second access network to request a bid to service the mobile station 700. The first token may comprise first authentication information and the second token may comprise second authentication information. The second token may also comprise at least one of quality of service requirements, authentication information for the mobile station, an identity of the mobile station, primary service provider information, and information about the first access network.

The various teachings described above enable a negotiation of the right to service a particular mobile station in real-time, in an ad-hoc manner between multiple different access networks. These teachings are directed to bidding by the user (or software on the user device) instead of auctioning of bandwidth. Meanwhile, the user is under the control of the current access network that holds, for example, the authentication parameters.

These teachings provide transactional elements to enable a business model in which access networks with available capacity may "buy users" from incumbent access networks. This would enable smaller networks (even with private WLAN access point owners) to derive income from their excess bandwidth. The resource being sold is the user (with some constraints) and the buyers are competing networks.

The selling of a user refers to a real-time financial agreement between a first access network and a second access network where the user's traffic is carried via the second access network for a negotiated duration. The second access network receives money or some other benefit in return. The access networks may alternatively negotiate for a certain number of calls or sessions instead of time duration.

As discussed above, this process may be of particular value to a proprietor having, for example, a WLAN network with available bandwidth. By providing wireless service via the WLAN to other nearby networks, the owner of the WLAN may earn money from excess bandwidth not currently being used, and the initial servicing network may alleviate congestion and/or reduce its costs.

A token is utilized for transactions between the access networks. The token includes a plurality of information about the device, including the identity of the device, information about the primary service provider, information about the current access network, quality of service requirements, and authentication information for the user that are temporary valid. The token may be stored in the network and in the device. Alternatively, the token may be stored only in the network. The token may be available at all times or it may be generated just when the current network decides to sell the user. Tokens are utilized to authenticate the user and provide corresponding service.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
   negotiating, between the mobile station and the first access network, to generate the first token and a second token, wherein the first token is stored in the first access network and the second token is stored in the mobile station;
   servicing a mobile station via a first access network, the first access network being in communication with a server;
   detecting by the mobile station services by a second access network;
   sending by the mobile station to the second access network the second token;
   negotiating, between the first access network and the second access network, for a right for the second access network to provide wireless service to the mobile station, the negotiation comprising sending an offer of a benefit from the second access network to the first access network wherein the offer for benefit comprises at least one of the second access network providing a monetary payment to the first access network and a reduction of a load on the first access network by the second access network;

accepting the offer of the benefit from the second access network and transmitting a first token from the first access network to the second access network; and transferring the mobile station from the first access network to the second access network after receipt of the first token.

2. The method of claim 1, wherein the first access network and the second access network utilize different servicing technologies.

3. The method of claim 1, wherein negotiating, between the first access network and the mobile station, comprising generating the first token having first authentication information and the second token having second authentication information.

4. The method of claim 1, wherein the first token comprises at least one of quality of service requirements, authentication information for the mobile station, an identity of the mobile station, primary service provider information, and information about the first access network.

5. The method of claim 1, further comprising sending a request for information about the mobile station from the second access network to at least one access network comprising at least the first access network.

6. The method of claim 5, further comprising sending, by the first access network, a partial token to at least the second access network in response to the request, the negotiating being performed in response to the second access network receiving the partial token.

7. The method of claim 1, further comprising sending, by the mobile station to at least the at least one access network comprising the second access network, the second token, wherein the negotiating, between the first access network and the second access network, is performed in response to the second access network receiving the second token.

8. The method of claim 1, further comprising establishing a connection between the second access network and the server in response to the transferring.

\* \* \* \* \*